UNITED STATES PATENT OFFICE.

ERNEST SOLVAY, OF BRUSSELS, BELGIUM.

MANUFACTURE OF CAUSTIC SODA.

SPECIFICATION forming part of Letters Patent No. 362,677, dated May 10, 1887.

Application filed February 12, 1887. Serial No. 227,422. (No specimens.)

*To all whom it may concern:*

Be it known that I, ERNEST SOLVAY, a Belgian subject, residing at Brussels, Belgium, have invented new and useful improvements in the manufacture of caustic soda or caustic potash and of carbonic acid from mono or other carbonate of soda or potash, of which the following is a specification.

This invention relates to improvements founded upon the process set forth in the specification of Patent No. 274,619, dated March 27, 1883, granted to Professor Doctor Carl Löwig, of Breslau. In the said specification a process is described for making caustic alkalies by heating their respective carbonates with oxide of iron, used in stated proportions, in closed retorts or muffles, or, as an alternative, in reverberatory furnaces. Now, I have found that great improvement may be made in this employment of oxide of iron, as proposed in the specification of the patent hereinbefore referred to, which will obviate to a very considerable extent the waste of fuel which occurs, whether iron or clay retorts or muffle furnaces, or even reverberatory furnaces, be employed; and, also, that the ordinary low-test carbonate of soda of commerce, (soda-ash,) especially that made by the Le Blanc process, is not well suited for this process, probably because of its impurities, and that any impurity ordinarily found in crude carbonate has a tendency to prevent the intimate mixture of the molecules of carbonate of soda and oxide of iron, and that the impurities usually present in low-test alkali cause the fluxing of the mass, thus preventing the carbonic acid from escaping from the mixture when heated to the proper temperature. The process requires a most intimate mixture of the carbonate of soda with the oxide of iron. I therefore prefer to employ a high-test carbonate of soda, obtained by heating the bicarbonate of soda obtained by the ammonia-soda process to a moderate temperature, not exceeding 300° centigrade. The carbonate of soda so obtained is an infinitesimal fine powder, which by proper mixing apparatus can be brought into the most intimate contact with the oxide of iron. Good results can also be obtained by using the mixture of monocarbonate and bicarbonate of soda, which is obtained by heating the bicarbonate of soda of the ammonia-soda process to a temperature of between 80° and 100° centigrade, until all the ammonia contained in the said bicarbonate has been driven off; or the bicarbonate of soda from the ammonia-soda process may directly be mixed with the necessary quantity of oxide of iron, and this mixture be heated to obtain caustic soda. In this latter case I prefer to heat the mixture of bicarbonate of soda and oxide of iron, in the first instance, in closed apparatus, such as are now used in ammonia-soda works for converting the bicarbonate into monocarbonate of soda, and which allow of the collection and utilization of the ammonia and carbonic acid given off in the operation. The hot mixture of monocarbonate of soda and oxide of iron obtained in this closed apparatus I then transfer while still hot into another apparatus or furnace, where I submit it to the necessary temperature for driving out the rest of the carbonic acid in order to obtain caustic soda.

It has been found in practice, when working the process as described in the above-mentioned specification, that as soon as the reaction has once commenced the mixture of alkaline carbonate with oxide of iron becomes surrounded by an atmosphere of nearly pure carbonic acid produced by the reaction itself. In such an atmosphere the reaction itself proceeds very slowly. Even in the ordinary reverberatory furnace, the carbonic acid, being much heavier than the fire-gases passing through the furnace, remains near the floor of the furnace, surrounds the materials employed, and prevents the reaction proceeding with sufficient rapidity and completeness. I have discovered, however, that if the process be carried out in such a way as to constantly remove the materials employed out of the nearly-pure carbonic acid produced by the reaction and to bring them again and again into an atmosphere relatively poor in carbonic acid, the reaction proceeds quickly and can be completed in a reasonable time, and also that the presence of steam in such fire-gases materially facilitates this reaction.

I find that my object may be advantageously effected by using a cylindrical or barrel-shaped furnace revolving on a horizontal or nearly-horizontal axis and lined with fire-clay blocks in such a way as to form a number of projecting radial ribs or breakers of fire-brick parallel to the axis of the cylinder. In some cases, in place of projecting ribs, the lining can be arranged in the form of steps or serrations, one face of which is radial, the other tangential, curved, or oblique to the radius. The furnace employed in this case is revolved with the radial faces advancing. Hot gas relatively poor in $CO^2$ passes through the interior of the revolving furnace. I can for this purpose employ the hot products of combustion of an ordinary fire-place, to which steam, preferably superheated, may advantageously be added, but only in such quantity as not to reduce the temperature of the furnace below that required for expeditious working; but as it is preferable to use hot gases containing as little $CO^2$ and as much steam as possible, I purpose to employ the products of combustion of ordinary producers of gas, both in regenerators or otherwise previously heated, to which steam, preferably superheated, may be added in such quantity as the temperature required will permit; or I employ, instead of ordinary producer-gas, the gas produced by the incomplete combustion of coal by a mixture of air and steam, or, still better, the gas produced by passing steam alone through incandescent fuel, (commonly called "water-gas,") which both produce steam on being burned with air and yield a gas of high temperature containing much less $CO^2$ than that obtained from ordinary producer-gas under the same circumstances.

The material introduced into the furnace is lifted up by the projecting ribs or steps or serrations to a certain height, and then falls through the fire-gases passing through the furnace, whereby the nearly-pure carbonic acid formed in the interstices of the mass becomes replaced by the fire-gases and no longer hinders the progress and completion of the reaction between the substances employed, which can now be completed within a few hours and at a reasonable expense of fuel, thus effecting great economy and improvement in the manufacture of caustic soda or caustic potash. Modifications of the heating and agitating apparatus may be employed.

I claim as my invention—

1. In the manufacture of caustic soda or caustic potash and of carbonic acid from mono or other carbonate of soda or potash by heating the respective carbonates with oxide of iron, heating bicarbonate of soda obtained by the ammonia-soda process to a moderate temperature, and mixing the carbonate of soda so obtained, in a fine powder or otherwise, with oxide of iron, or mixing bicarbonate of soda obtained by the ammonia-soda process directly with oxide of iron and heating the mixture in closed apparatus, then transferring the heated mixture into another apparatus or furnace, where it is heated to the necessary temperature to drive out the remaining carbonic acid, so as to obtain caustic soda, substantially as described.

2. In the manufacture of caustic soda or caustic potash and of carbonic acid from mono or other carbonates of soda or potash by heating the respective carbonates with oxide of iron, removing the materials employed from the nearly-pure carbonic acid produced by the reaction, and bringing them repeatedly into an atmosphere comparatively free from carbonic acid by means of a cylindrical or barrel-shaped revolving furnace lined with fire-bricks, forming projecting radial ribs or steps or serrations, whereby the material is lifted up and then falls through the gases passing through the furnace, substantially as described.

ERNEST SOLVAY.

Witnesses:
R. S. KIRKPATRICK,
H. T. E. KIRKPATRICK.